Aug. 2, 1938.   C. B. ULRICH   2,125,469
MINERAL TRAP
Filed Dec. 23, 1935   2 Sheets-Sheet 1
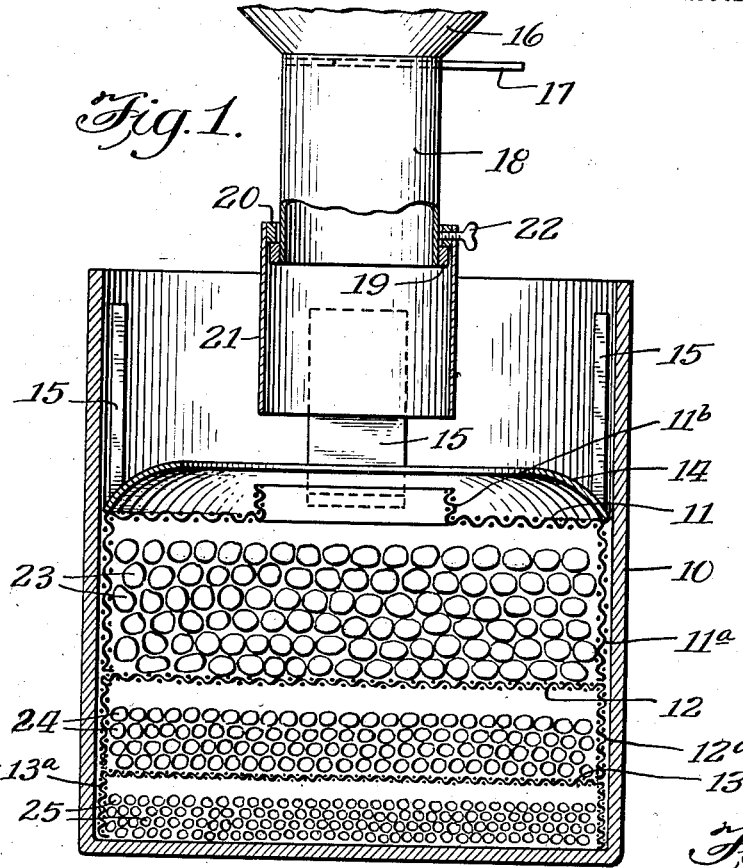
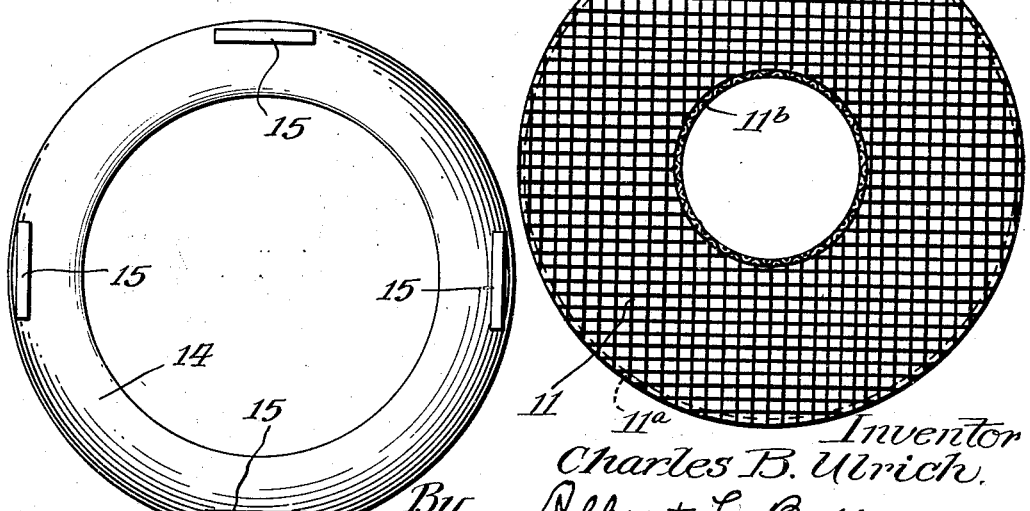
Inventor
Charles B. Ulrich
By Albert C. Bell
Atty.

Aug. 2, 1938.    C. B. ULRICH    2,125,469
MINERAL TRAP
Filed Dec. 23, 1935    2 Sheets-Sheet 2
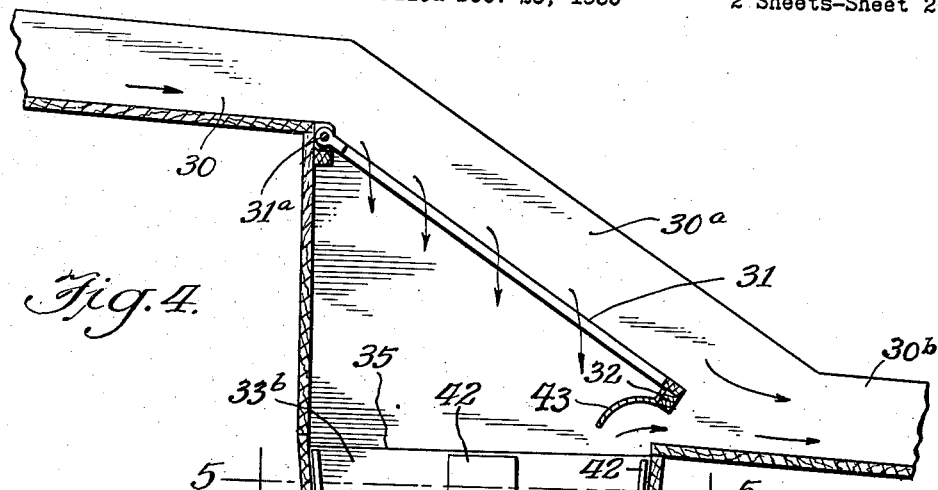
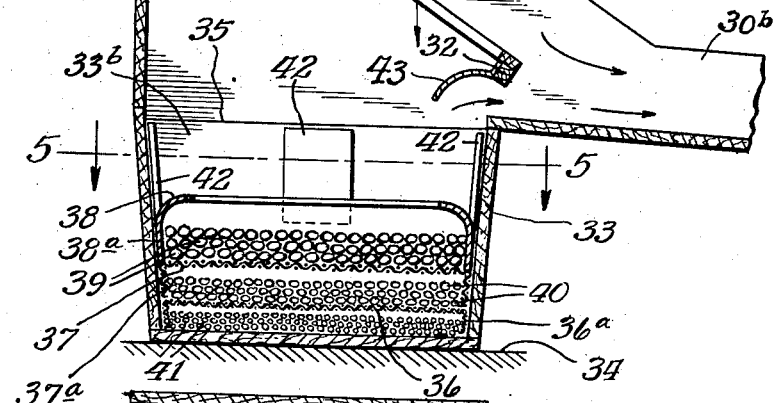
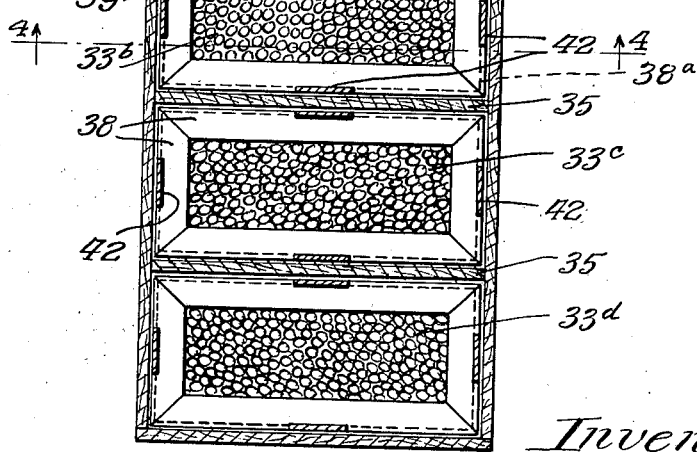
Inventor
Charles B. Ulrich
By Albert C. Bell    Atty.

Patented Aug. 2, 1938

2,125,469

UNITED STATES PATENT OFFICE 2,125,469

MINERAL TRAP

Charles B. Ulrich, Jamestown, N. Y.

Application December 23, 1935, Serial No. 55,851

18 Claims. (Cl. 209—206)

My invention relates to an improved mineral trap for separating heavy mineral particles of different sizes, such as, for example, gold nuggets and particles of rare metals, as well as mineral particles containing such metals, from lighter particles with which the heavy mineral particles are associated before separation, my trap further operating to separate or classify the recovered heavy mineral and metal particles into different sizes to facilitate any further treatment that may be required or desired.

My improved mineral trap consists essentially of a housing containing a plurality of superposed screens of different mesh and pieces of subdivided baffling material in the compartments formed between said screens, the baffling material in each of said compartments preferably not completely filling said compartment, but, on the other hand, leaving sufficient space above it in said compartment so that the pieces of the baffling material may be agitated and separated from each other to permit the heavy mineral and metal particles to settle by gravity between said pieces of baffling material, to the bottom of the compartment containing said baffling material. The uppermost screen is preferably of largest mesh, the next lower screen is of smaller mesh, and so on downwardly through the trap, the pieces of baffling material in the uppermost compartment so formed, being of largest size, the pieces of baffling material in the next lower compartment being of smaller size, and so on downwardly through the remaining compartments. Said baffling material may consist of gravel or broken stone or any similar material that retains its form and properties in water and that is heavier than water and yet not so heavy as to prevent the ready movement and agitation of its pieces by the eddying flow of water currents. The pieces of baffling material in each of said compartments, are preferably of a size to be retained in said compartment by the screen or screens constituting a wall or walls of said compartment. The screen forming the top wall of each of said compartments, is preferably horizontal and turned downwardly at its edges to form the vertical side walls of said compartment, which side walls support said screen above the top of the baffling material in said compartment, leaving as much space as desired between said baffling material and said screen, in which the pieces of said baffling material may move freely in all directions from each other under the agitating effect of eddying water flow in said compartment, allowing the heavy mineral and metal particles being separated and classified, to sink freely between said pieces of baffling material to the bottom of the compartment.

On the uppermost screen of the trap, I preferably locate a baffle ring or band of sheet metal extending around the outer edge of said screen adjacent the housing of the trap, which ring or band is preferably concave on its lower surface and is directed upwardly and inwardly towards the central portion of the trap, to produce agitation and eddying flow in the trap.

In using the trap described, heavy mineral and metal particles mixed with dirt, silt, or lighter mineral particles from which said heavier particles are to be separated, are fed into the upper portion of the trap and either at the same time or subsequently, water flow is directed downwardly in the central portion of the trap; on striking the pieces of baffling material, the water stream is broken up, acting on the said baffling material to agitate it and to separate and lift its pieces, at the same time rubbing said pieces against the heavy mineral and metal particles and scouring from them the dirt, silt and other foreign material that may be adhering to them; at the same time, since there is no outlet from the lower portion of the trap housing, water flow is produced upwardly along the walls of the housing, which strikes the baffle ring or band and is deflected thereby into the downwardly moving water stream, producing eddying flow of water, pieces of baffling material, heavy mineral and metal particles, dirt silt and foreign matter, that thoroughly scours said heavy mineral and metal particles, and thoroughly mixes said dirt, silt, foreign matter and relatively light particles with the water; the used water is discharged from the upper part of the trap, carrying with it the material with which it has been mixed and which will flow with it, which includes substantially all of the solids excepting the heavy mineral and metal particles; the separation of the pieces of baffling material by the eddying flow referred to, permits the heavy mineral and metal particles to settle by gravity between them to the bottom part of each compartment, where the said particles that are larger than the mesh of the bottom screen of said compartment are retained, the said heavy mineral and metal particles that are of smaller size, passing through said bottom screen into the next lower compartment where the action described is repeated, and so on for each of the compartments of the trap.

The rate of flow of the water into the trap is preferably great enough to produce the agitation described, in the lowermost compartment of the trap, after passing through the compartments above it.

It will be understood that the trap described is a unit construction, which may be duplicated as many times as desired, to produce a complete trap equipment for treating heavy mineral and metal particles, where the quantity of such particles is large. It will also be understood that the scouring and cleaning action described, may be continued in any unit trap after the heavy mineral and metal particles have been placed therein, for as long a time as desired, depending upon how tenaciously the foreign matter adhere to said particles, and upon the nature of said foreign matter; it will also be noted that said scouring and cleaning action continues in any unit trap even after gravity separation of the heavy mineral and metal particles has been effected in the several compartments of the unit trap, for as long a time as said water flow continues in said unit trap.

My invention will be best understood by reference to the accompanying drawings showing a preferred embodiment thereof, in which Fig. 1 illustrates a unit trap in central, vertical, sectional view, Fig. 2 shows in top view, the baffle ring or band used in the trap shown in Fig. 1, removed from said trap, Fig. 3 shows in top view, the uppermost screen used in the trap shown in Fig. 1, removed from said trap, Fig. 4 illustrates in longitudinal, vertical, sectional view, a portion of a placer sluiceway having a trap equipment in accordance with my invention associated therewith, taken along the line 4—4 in Fig. 5, and Fig. 5 is a horizontal, sectional view of the trap equipment shown in Fig. 4, taken along the line 5—5.

Similar numerals refer to similar parts throughout the several views.

As shown in Fig. 1, my trap construction consists of a cylindrical housing 10 having imperforate bottom and side walls, in which horizontal screens 11, 12 and 13 are disposed above each other.

Each of the screens 11, 12 and 13 is circular and just enough smaller in diameter than the inner diameter of the housing 10, so that it may readily be inserted in and removed from said housing. The lowermost screen 13 is of relatively fine mesh and continuous across the housing, and is provided at its outer edge, with a downwardly extending flange 13a bent from the body portion of the screen and resting at its lower edge on the bottom of the housing. The screen 12 just above the screen 13, is of larger mesh than the screen 13, but is otherwise of the same form as the latter, and is provided with a downwardly extending edge flange 12a formed from said screen material and resting at its lower edge on the screen 13. The screen 11 which is above the screen 12, is of larger mesh than the screen 12 and is of the same diameter as the screen 12, and is provided at its outer edge with a downwardly extending edge flange 11a formed from said screen material and resting at its lower edge on the screen 12. The screen 11 is provided with a central opening around which a flange 11b of the screen material extends upwardly, said opening permitting the free flow of the mixture of water and material to be treated in the trap, into the upper compartment thereof, between the screens 11 and 12.

Resting on the outer edge portion of the screen 11 and closely adjacent the inner surface of the housing 10, is a deflector band or ring 14 of metal, which has a substantially larger central opening than the opening within the flange 11b, and which is preferably curved radially with its concave surface lowermost, to direct water and material carried thereby which flows upwardly near the inner surface of the housing 10, upwardly and inwardly towards the axis of the housing 10, to impinge against the downwardly flowing stream of water and material to be treated, thereby producing an eddying flow of the water and material carried thereby, in the several compartments of the trap. The outer edge portion of the deflector ring 14 has rigidly secured thereto in any suitable manner, the lower ends of vertical metal bars 15 extending upwardly from said ring adjacent the inner surface of the housing 10, to hold said ring down against the screen 11 by the weight of said bars, against the lifting action of said upward flow against said ring.

Water and material to be treated are supplied to the trap, from a hopper 16 which may receive said material from apparatus effecting previous operations thereon, or otherwise, said hopper having at its lower end, a sliding gate 17 for controlling the amount of flow from said hopper. A discharge pipe 18 extends downwardly from the lower end of the hopper 16, and carries around its lower end, a ring 19 upon which a ring 20 carried by a movable pipe 21, rests when said pipe 21 is in its lowermost position. The lower end of the pipe 18 is preferably just above the upper end of the housing 10, so that a filled trap may be moved from under said pipe, and a clean trap may be moved under and in axial alinement with the same. In use, the pipe 21 extends downwardly into the housing 10, with its lower end above and near enough to the flange 11b, to direct the water and material to be treated, into the opening within said flange 11b. The ring 20 has a thumb screw 22 threaded through it, to hold the ring 20 in any desired position vertically on the pipe 18, said ring 20 and the pipe 21 being movable upwardly and telescoping with the pipe 18 to bring the lower end of the pipe 21 to the same height as the lower end of the pipe 18, for trap removal and replacement purposes.

The upper compartment of the trap between the screens 11 and 12, contains pieces of subdivided baffling and securing material 23 therein, for example, of gravel, broken stone, or other material unaffected by water, which pieces are a little larger than the mesh of the screen 11, so that they are retained in said upper compartment by said screens 11 and 12. The next lower compartment between the screens 12 and 13, contains pieces of similar baffling and scouring material 24, which are smaller than the pieces of baffling material 23 and a little larger than the mesh of the screen 12, as a result of which they are retained between the screens 12 and 13. The lowermost compartment between the screen 13 and the bottom of the housing 10, contains pieces of similar baffling and scouring material 25, which are smaller than the pieces of baffling material 24 and a little larger than the mesh of the screen 13, as a result of which they are retained in said lowermost compartment. The baffling material in each of said compartments is of a depth substantially less than the depth of the corresponding compartment, so that the baffling material in any of said compartments may move freely with the eddying water flow, to separate the pieces of said baffling material from each other and to scour and clean the heavy metal and mineral particles being treated.

In operating the trap, the mineral and metal particles to be treated may be fed continuously into the water in the hopper 16, or intermittently, depending upon the amount of cleaning and scouring of said particles that is required, and the trap is filled with the mixture of water and material fed to it from said hopper, the excess water resulting from continued flow thereof, running out of the trap over the upper edge of the housing 10, and carrying with it the dirt, slime, silt, and fine particles from the treated material that are light enough, small enough, or sufficiently soluble to be carried upwardly and from the housing by the water flowing therefrom. The eddying and agitating flow produced in each compartment, separates the pieces of baffling material and the heavy mineral and metal particles therein, permitting the free flow of the water and smaller particles into the next lower compartment, at the same time repeatedly rubbing said pieces and particles in each compartment against each other to effectively scour from the surfaces of said particles, any foreign material that may adhere to them; at the same time, mineral and metal particles of such size as can pass respectively through the screens 12 and 13, find their way into the lower compartments of the trap, so that the interstices between the pieces and particles retained in each of the upper compartments, are always of sufficient size to permit smaller particles to flow or move downwardly by gravity into the lower compartments. Thus the mineral and metal particles retained in each of the upper compartments, are of graded and classified size, and the finest ones of said retained particles, accumulate in the lowermost one of said compartments.

In Figs. 4 and 5, I illustrate the application of my improved trap to a placer sluiceway 30, said sluiceway having a substantial and abrupt drop at 30a over the trap and continuing at a lower level 30b to which the water, débris and treated material not retained by the trap, are delivered for continued progress down the sluiceway. At the section 30a of the sluiceway, a grizzly 31 is supported in a position inclined downwardly towards the lower portion 30b of the sluiceway, said grizzly being hinged at its upper edge at 31a and resting at its lower portion on a cross bar 32 of the sluiceway structure. The grizzly 31 directs the boulders, roots, and pieces of waste material that are not to be treated in the trap, to the lower portion 30b of the sluiceway for continued movement down the sluiceway, the bars of the grizzly being spaced to permit only mineral and metal particles of sizes to be treated in the trap, to pass between them into the trap, together with water, dirt and fine mineral particles carried thereby.

Below the grizzly 31, the floor of the lower portion 30b of the sluiceway is provided with an opening, and a trap having a housing 33 is placed below said opening to receive the water and material delivered downwardly from the sluiceway 30 through the grizzly 31 and then through said opening, the upper edge of said housing 33 being a close fit with the sluiceway structure, so that the water and material carried thereby, flowing from said trap, will flow into the lower sluiceway portion 30b, the bar 32 being spaced sufficiently above the floor of the sluiceway portion 30b, to not interfere with the discharge flow under it from the housing 33.

The housing 33 rests on any suitable supporting surface 34, and has imperforate side and bottom walls, so that water and material carried thereby can flow into and from it, only through its open top. The housing 33 is of rectangular cross-section horizontally, having a width equal to the width of the opening in the sluiceway, and a length equal to the width of the sluiceway. Said housing 33 is preferably divided into sections 33a, 33b, 33c and 33d by vertical partitions 35 extending laterally across it as shown in Fig. 5, each of said trap sections having the construction shown for the section 33b in Fig. 4. As shown in Fig. 4, the trap section 33b contains a lower horizontal screen 36 of relatively small mesh, having vertical edge flanges 36a resting at their lower edges on the bottom of the housing 33 to support said screen in the section 33b, said flanges consisting preferably of parts of the material of the screen 36 bent downwardly at the edges of said screen. Above the screen 36, a second horizontal screen 37 of larger mesh than the screen 36, is disposed, having edge flanges 37a of screen material extending downwardly and resting on the screen 36. Above the screen 37 a horizontal deflector band 38 of metal is disposed adjacent the vertical walls of the section 33b, and supported by downwardly extending edge flanges 38a resting at their lower edges on the screen 37. The band 38 is preferably curved upwardly and inwardly with its concave surface lowermost, to direct water and material carried thereby that flows upwardly adjacent the vertical walls of the section 33b, towards the central part thereof, to react upon downward flow into said trap section and produce eddying flow of the water and material therein. The screens 36 and 37 divide the trap section 33b into a plurality of superposed compartments below said screens and above the screen 37 respectively, said screens and the deflector band 38 being rectangular and closely but removably fitting the vertical walls of said section. Said compartments contain pieces of baffling and scouring material 39, 40 and 41 of similar kind and having similar relations to said screens and the compartments containing them, as above described for the baffling material 23, 24 and 25. The deflector band 38 has rigidly secured to its outer edge portion in any convenient manner, the lower ends of upwardly extending metal bars 42, the weight of which holds said deflector band 38 against upward movement, by the action of the water and material under it.

The trap shown in Fig. 4, is provided with a deflector plate 43 extending under the grizzly 31 from the bar 32, which plate extends from end to end of the trap, and is preferably curved downwardly to direct all of the water and material flowing through the grizzly 31, into said trap, and at the same time, to prevent interference with the discharge of water and material carried thereby, from the trap and under the bar 32.

The operation of the trap section 33b, and of each of the trap sections 33a, 33c and 33d, is substantially the same as above described for the trap shown in Fig. 1, and when said trap sections are filled with recoverable material, the trap may be cleaned by stopping the sluiceway flow and raising the grizzly 31 on its hinge connection 31a, affording free access to said trap, or, if preferred, the entire trap may be moved on the supporting surface 34 from under the grizzly 31 and a similar clean trap may be substituted. It will be understood that a trap of the kind shown in Figs. 4 and 5, may have as many sections as desired, to facilitate the removal and assembly of the parts contained in each section in cleaning the trap. It will also be understood that with any construction of my trap described, any desired number of superposed compartments may be used, depending upon the classification desired of the recovered particles.

While I have shown my invention in the particular embodiment above described, it will be understood that I do not limit myself to the same, as I may employ equivalents thereof known to the art at the time of the filing of this application, without departing from the scope of the appended claims.

What I claim is:

1. In a mineral trap, the combination of a housing having imperforate side and bottom walls and open at its top, a plurality of screens in said housing and extending horizontally across the same and establishing superimposed compartments in said housing, said screens having downwardly extending edge flanges to support them, a deflecting metal band above the uppermost one of said screens to direct water and material flowing upwardly against said band towards the central portion of said housing, and pieces of baffling material loosely contained in said compartments and retained therein by said screens.

2. In a mineral trap, the combination of a housing having imperforate side and bottom walls and open at its top, a plurality of screens in said housing and extending horizontally across the same and establishing superimposed compartments in said housing, said screens having downwardly extending edge flanges to support them, a deflecting metal band above the uppermost one of said screens to direct water and material flowing upwardly against said band towards the central portion of said housing, pieces of baffling material loosely contained in said compartments and retained therein by said screens, the uppermost one of said screens having a central aperture therethrough, and means for directing water and material to be treated through said aperture.

3. In a mineral trap, the combination of a housing having imperforate side and bottom walls and open at its top, a plurality of screens in said housing and extending horizontally across the same and establishing superimposed compartments in said housing, said screens having downwardly extending edge flanges to support them, a deflecting metal band above the uppermost one of said screens to direct water and material flowing upwardly against said band towards the central portion of said housing, and pieces of baffling material loosely contained in said compartments and retained therein by said screens, said pieces of baffling material being larger respectively than the mesh of said screens and retained thereby in said compartments.

4. In a mineral trap, the combination of a housing having imperforate side and bottom walls and open at its top, a plurality of screens in said housing and extending horizontally across the same and establishing superimposed compartments in said housing, said screens having downwardly extending edge flanges to support them, a deflecting metal band above the uppermost one of said screens to direct water and material flowing upwardly against said band towards the central portion of said housing, and pieces of baffling material loosely contained in said compartments and retained therein by said screens, said screens having progressively finer mesh from top to bottom of said housing.

5. In a mineral trap, the combination of a housing having imperforate side and bottom walls and open at its top, a plurality of screens in said housing and extending horizontally across the same and establishing superimposed compartments in said housing, said screens having downwardly extending edge flanges to support them, a deflecting metal band above the uppermost one of said screens to direct water and material flowing upwardly against said band towards the central portion of said housing, and pieces of baffling material loosely contained in said compartments and retained therein by said screens, the depth of said baffling material in each of said compartments being substantially less than the depth of the compartment containing it.

6. In a mineral trap, the combination of a housing having imperforate side and bottom walls and open at its top, a plurality of screens in said housing and extending horizontally across the same and establishing superimposed compartments in said housing, said screens having downwardly extending edge flanges to support them, a deflecting metal band above the uppermost one of said screens to direct water and material flowing upwardly against said band towards the central portion of said housing, and pieces of baffling material loosely contained in said compartments and retained therein by said screens, said pieces of baffling material being larger respectively than the mesh of said screens and retained thereby in said compartments, and said screens having progressively finer mesh from top to bottom of said housing.

7. In a mineral trap, the combination of a housing having imperforate side and bottom walls and open at its top, a plurality of screens in said housing and extending horizontally across the same and establishing superimposed compartments in said housing, said screens having downwardly extending edge flanges to support them, a deflecting metal band above the uppermost one of said screens to direct water and material flowing upwardly against said band towards the central portion of said housing, and pieces of baffling material loosely contained in said compartments and retained therein by said screens, said pieces of baffling material being larger respectively than the mesh of said screens and retained thereby in said compartments, the depth of said baffling material in each of said compartments being substantially less than the depth of the compartment containing it.

8. In a mineral trap, the combination of a housing having imperforate side and bottom walls and open at its top, a plurality of screens in said housing and extending horizontally across the same and establishing superimposed compartments in said housing, said screens having downwardly extending edge flanges to support them, a deflecting metal band above the uppermost one of said screens to direct water and material flowing upwardly against said band towards the central portion of said housing, and pieces of baffling material loosely contained in said compartments and retained therein by said screens, said pieces of baffling material being larger respectively than the mesh of said screens and retained thereby in said compartments, said screens having progressively finer mesh from top to bottom of said housing, the depth of said baffling material in each of said compartments being substantially less than the depth of the compartment containing it.

9. In a mineral trap, the combination of a housing having imperforate side and bottom walls and open at its top, a plurality of screens in said housing and extending horizontally across the same and establishing superimposed compartments in said housing, said screens having downwardly extending edge flanges to support them, a deflecting metal band above the uppermost one of said screens to direct water and material flowing upwardly against said band towards the central portion of said housing, pieces of baffling material loosely contained in said compartments and retained therein by said screens, and a telescoping tube for delivering water and material to be treated into said housing and consisting of upper and lower portions, said upper portion having its lower end above the top of said housing and said lower portion surrounding said upper portion and in its lower position extending into said housing adjacent the uppermost of said screens, said lower portion in its upper position having its lower end above the top of said housing.

10. In a mineral trap, the combination of a housing having imperforate side and bottom walls and open at its top, a plurality of screens in said housing and extending horizontally across the same and establishing superimposed compartments in said housing, said screens having downwardly extending edge flanges to support them, a deflecting metal band above the uppermost one of said screens to direct water and material flowing upwardly against said band towards the central portion of said housing, pieces of baffling material loosely contained in said compartments and retained therein by said screens, a telescoping tube for delivering water and material to be treated into said housing and consisting of upper and lower portions, said upper portion having its lower end above the top of said housing and said lower portion surrounding said upper portion and in its lower position extending into said housing adjacent the uppermost of said screens, said lower portion in its upper position having its lower end above the top of said housing, and means for holding said lower portion in its upper position.

11. In a mineral trap, the combination of a sluiceway having an opening in its floor between upper and lower portions of said sluiceway, said lower portion being substantially lower than said upper portion to provide a substantial head of water flow through said opening, an inclined grizzly extending over said opening from the lower edge of said upper sluiceway portion to a position at its lower edge above and spaced upwardly from said lower sluiceway portion, a trap housing below said opening and having its side walls engaging the edges of said opening and also the side walls of said sluiceway, the sides and bottom of said housing being imperforate, spaced and horizontal screens in and dividing said housing into superposed compartments, and subdivided baffling material in said compartments.

12. In a mineral trap, the combination of a sluiceway having an opening in its floor between upper and lower portions of said sluiceway, said lower portion being substantially lower than said upper portion to provide a substantial head of water flow through said opening, an inclined grizzly extending over said opening from the lower edge of said upper sluiceway portion to a position at its lower edge above and spaced upwardly from said lower sluiceway portion, a trap housing below said opening and having its side walls engaging the edges of said opening and also the side walls of said sluiceway, the sides and bottom of said housing being imperforate, spaced and horizontal screens in and dividing said housing into superposed compartments, subdivided baffling material in said compartments, vertical partitions dividing said housing into trap sections and a deflecting band around each of said sections above the uppermost screen therein and directing upward flow against said band to the central portion of the corresponding trap section.

13. In a mineral trap, the combination of a sluiceway having an opening in its floor between upper and lower portions of said sluiceway, said lower portion being substantially lower than said upper portion to provide a substantial head of water flow through said opening, an inclined grizzly extending over said opening from the lower edge of said upper sluiceway portion to a position at its lower edge above and spaced upwardly from said lower sluiceway portion, a trap housing below said opening and having its side walls engaging the edges of said opening and also the side walls of said sluiceway, the sides and bottom of said housing being imperforate, spaced and horizontal screens in and dividing said housing into superposed compartments, subdivided baffling material in said compartments, said grizzly having a hinge connection at its upper edge, means for supporting the lower edge of said grizzly, and a deflector plate under the lower portion of said grizzly and above and spaced from the delivery portion of said housing.

14. In a mineral trap, the combination of a sluiceway having an opening in its floor between upper and lower portions of said sluiceway, said lower portion being substantially lower than said upper portion to provide a substantial head of water flow through said opening, an inclined grizzly extending over said opening from the lower edge of said upper sluiceway portion to a position at its lower edge above and spaced upwardly from said lower sluiceway portion, a trap housing below said opening and having its side walls engaging the edges of said opening and also the side walls of said sluiceway, the sides and bottom of said housing being imperforate, spaced and horizontal screens in and dividing said housing into superposed compartments, and subdivided baffling material in said compartments, the depths of said baffling material respectively in said compartments being substantially less than the depths of said compartments.

15. In a mineral trap, the combination of a sluiceway having an opening in its floor between upper and lower portions of said sluiceway, said lower portion being substantially lower than said upper portion to provide a substantial head of water flow through said opening, an inclined grizzly extending over said opening from the lower edge of said upper sluiceway portion to a position at its lower edge above and spaced upwardly from said lower sluiceway portion, a trap housing below said opening and having its side walls engaging the edges of said opening and also the side walls of said sluiceway, the sides and bottom of said housing being imperforate, spaced and horizontal screens in and dividing said housing into superposed compartments, and subdivided baffling material in said compartments, said screens having progressively finer mesh from top to bottom of said housing.

16. In a mineral trap, the combination of a housing having imperforate side and bottom walls and open at its top, a plurality of screens in said housing and extending horizontally across the same and establishing superimposed compartments in said housing of vertical depths providing for agitation and scouring action in said compartments by water flow vertically therein, supports for said screens holding them in said spaced relation vertically, and pieces of baffling material loosely contained in said compartments and retained therein by said screens, said baffling material being of substantially less vertical depth in each compartment than the vertical depth of said compartment, whereby space in said compartments is provided for free agitation and movement therein of said baffling material by water flow downwardly into said housing and upwardly out of said housing, to scour and clean mineral particles fed into said housing for treatment.

17. In a mineral trap, the combination of a housing having imperforate side and bottom walls and open at its top, a plurality of screens in said housing and extending horizontally across the same and establishing superimposed compartments in said housing of vertical depths providing for agitation and scouring action in said compartments by water flow vertically therein, supports for said screens holding them in said spaced relation vertically, and pieces of baffling material loosely contained in said compartments and retained therein by said screens, said baffling material being of substantially less vertical depth in each compartment than the vertical depth of said compartment, whereby space in said compartments is provided for free agitation and movement therein of said baffling material by water flow downwardly into said housing and upwardly out of said housing, to scour and clean mineral particles fed into said housing for treatment, said pieces of baffling material being larger respectively than the mesh of said screens and retained thereby in said compartments.

18. In a mineral trap, the combination of a housing having imperforate side and bottom walls and open at its top, a plurality of screens in said housing and extending horizontally across the same and establishing superimposed compartments in said housing of vertical depths providing for agitation and scouring action in said compartments by water flow vertically therein, supports for said screens holding them in said spaced relation vertically, and pieces of baffling material loosely contained in said compartments and retained therein by said screens, said baffling material being of substantially less vertical depth in each compartment than the vertical depth of said compartment, whereby space in said compartments is provided for free agitation and movement therein of said baffling material by water flow downwardly into said housing and upwardly out of said housing, to scour and clean mineral particles fed into said housing for treatment, said pieces of baffling material being larger respectively than the mesh of said screens and retained thereby in said compartments, said screens having progressively finer mesh from top to bottom of said housing.

CHARLES B. ULRICH.